US008091044B2

(12) United States Patent (10) Patent No.: US 8,091,044 B2
Haynes et al. (45) Date of Patent: Jan. 3, 2012

(54) FILTERING THE DISPLAY OF FILES IN GRAPHICAL INTERFACES

(75) Inventors: Thomas R. Haynes, Apex, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2587 days.

(21) Appl. No.: 10/717,888

(22) Filed: Nov. 20, 2003

(65) Prior Publication Data

US 2005/0114305 A1 May 26, 2005

(51) Int. Cl.
*G06F 3/048* (2006.01)
(52) U.S. Cl. ............... 715/854; 715/853; 707/999.003; 707/999.004
(58) Field of Classification Search .................. 715/526, 715/853, 854; 707/3–4
See application file for complete search history.

(56) References Cited

U.S. PATENT DOCUMENTS

| | | | | |
|---|---|---|---|---|
| 5,519,865 | A | * | 5/1996 | Kondo et al. ............... 707/1 |
| 5,566,330 | A | * | 10/1996 | Sheffield ................... 707/4 |
| 5,630,122 | A | * | 5/1997 | Kaplan et al. .............. 707/4 |
| 5,644,740 | A | | 7/1997 | Kiuchi ................... 395/357 |
| 5,649,205 | A | | 7/1997 | Martins .................. 395/712 |
| 5,680,563 | A | * | 10/1997 | Edelman ................. 715/835 |
| 5,710,899 | A | * | 1/1998 | Eick ..................... 715/764 |
| 5,787,411 | A | * | 7/1998 | Groff et al. ............... 707/2 |
| 5,809,483 | A | * | 9/1998 | Broka et al. ............. 705/37 |
| 5,832,501 | A | | 11/1998 | Kain, III et al. ......... 707/103 |
| 5,838,317 | A | * | 11/1998 | Bolnick et al. ........... 715/764 |
| 5,913,038 | A | | 6/1999 | Griffiths ............... 395/200.61 |

(Continued)

FOREIGN PATENT DOCUMENTS

JP 11-328198 11/1999

(Continued)

OTHER PUBLICATIONS

IBM Technical Disclosure Bulletin, "Modified Template Attribute in "Some" Dialog Box", vol. 33, No. 11, Apr. 1991.

(Continued)

*Primary Examiner* — Weilun Lo
*Assistant Examiner* — Eric Wiener
(74) *Attorney, Agent, or Firm* — Cynthia G. Seal; Jeffrey L. Streets

(57) ABSTRACT

System, computer readable medium, and method for filtering the display of file objects for computer systems. In one aspect, a method comprises displaying a plurality of selectable items responsive to user input, wherein each of the selectable items describes a different filtering criterion and corresponds to a different range of values, and wherein the different ranges of values for the selectable items are based on the file objects present in a file object set that is being filtered for display of the file objects; receiving the user input from a user to at least one selected item of the selectable items to describe one or more filtering criteria for the display of the file objects in the file object set according to the user input and the at least one selected item; wherein the different ranges of values for the selectable items are based on actual ranges of an associated characteristic of the file objects of the file object set and on the distribution of the actual values of the associated characteristic in the file object set, wherein the different ranges are evenly divided between two extreme values that surround at least some of the actual values of the associated characteristic.

5 Claims, 4 Drawing Sheets

U.S. PATENT DOCUMENTS

| | | | | |
|---|---|---|---|---|
| 5,923,328 | A | | 7/1999 | Griesmer .................... 345/357 |
| 5,956,508 | A | * | 9/1999 | Johnson et al. ............... 719/315 |
| 5,973,695 | A | | 10/1999 | Walsh et al. .................. 345/357 |
| 6,049,783 | A | * | 4/2000 | Segal et al. ..................... 705/37 |
| 6,151,024 | A | | 11/2000 | Alimpich et al. ............. 345/357 |
| 6,269,407 | B1 | * | 7/2001 | Cink et al. .................... 719/315 |
| 6,271,846 | B1 | | 8/2001 | Martinez et al. ............. 345/357 |
| 6,279,016 | B1 | | 8/2001 | De Vorchik et al. .......... 707/526 |
| 6,462,762 | B1 | | 10/2002 | Ku et al. ....................... 345/853 |
| 7,139,762 | B2 | * | 11/2006 | Labarge et al. ............... 707/100 |

FOREIGN PATENT DOCUMENTS

WO      WO99/66394 A1    12/1999

OTHER PUBLICATIONS

"MS Access: Creating & Using Forms" Penn State: (Internet).
"Excel Quick Tips" (Internet).
Arcuri et al., "Method for adapting user interface elements based on historical usage", Publ. No. TW457455 (B), Oct. 1, 2001, Taiwan abstract, 1 page.

* cited by examiner

| Name | Size | Type | Modified | Created | Accessed |
|---|---|---|---|---|---|
| 99star.PDF | 764 KB | Adobe Acrobat Document | 6/19/2000 1:48 PM | 6/19/2000 1:47 PM | 12/19/2001 12:4... |
| sitemap.gif | 90 KB | GIF Image | 10/16/2000 9:40 AM | 10/16/2000 9:41... | 7/25/2002 10:04... |
| starion.jpg | 29 KB | JPEG Image | 6/19/2000 12:51 PM | 6/19/2000 12:51... | 12/19/2001 12:4... |
| StarionSpeakers.htm | 15 KB | HTML Document | 6/6/2000 9:38 AM | 6/6/2000 9:38 AM | 1/24/2002 9:45 AM |
| wilhalf.jpg | 53 KB | JPEG Image | 11/6/2000 1:08 PM | 11/6/2000 1:08 PM | 12/19/2001 12:4... |
| WilInVest.jpg | 24 KB | JPEG Image | 11/6/2000 1:08 PM | 11/6/2000 1:19 PM | 12/19/2001 12:4... |
| sitemap.gif | 90 KB | GIF Image | 10/16/2000 9:40 AM | 10/16/2000 9:41... | 7/25/2002 10:04... |
| starion.jpg | 29 KB | JPEG Image | 6/19/2000 12:51 PM | 6/19/2000 12:51... | 12/19/2001 12:4... |
| StarionSpeakers.htm | 15 KB | HTML Document | 6/6/2000 9:38 AM | 6/6/2000 9:38 AM | 1/24/2002 9:45 AM |
| wilhalf.jpg | 53 KB | JPEG Image | 11/6/2000 1:08 PM | 11/6/2000 1:08 PM | 12/19/2001 12:4... |
| WilInVest.jpg | 24 KB | JPEG Image | 11/6/2000 1:08 PM | 11/6/2000 1:19 PM | 12/19/2001 12:4... |

FIG. 2

FILTERING THE DISPLAY OF FILES IN GRAPHICAL INTERFACES

FIELD OF THE INVENTION

The present invention relates to file display and navigation for computer systems, and more particularly to file display and navigation in a graphical user interface.

BACKGROUND OF THE INVENTION

Graphical user interfaces (GUIs) allow users of computer systems to perform operating system functions and tasks with ease. For example, file navigation and organization are tasks that users need to perform with some regularity on a computer system, and these tasks are implemented in a graphical user interface through the display of icons and menus on a computer display screen. A typical implementation, as found in such operating systems as Microsoft Windows, Apple Computer's MacOS, etc., displays the contents of a directory or storage drive as a list of icons in a window, each icon representing a single file or other file object (such as a directory). File objects can be manipulated and accessed by clicking on and/or moving the icons with a cursor using a mouse or other pointing device. Folder icons can be displayed to indicate the presence of a directory, where files or folders may be stored "within" a folder and act as sub-directories under the directory; the sub-directories can be accessed by clicking on the folder.

When navigating lists of files and folders in current GUIs, a user must examine the entire file object contents of each directory or drive. This can be burdensome when the user desires to locate a particular file or folder in a location where there are a large number of file objects. Furthermore, the user may not want to display all of the file objects in other situations, such as, for example, to reduce a cluttered list of objects to only pertinent objects. In such situations, the user may know what types of characteristics he or she is looking for in the file objects. Accordingly, what is needed is a system and method for allowing a user to easily and quickly display subsets of files and folders in a GUI based on one or more of several desired criteria. The present invention addresses such a need.

SUMMARY OF THE INVENTION

One embodiment of the present invention provides a method for using filtering criteria in the display of file objects in a graphical user interface (GUI). The method comprises displaying a plurality of selectable items responsive to user input, wherein each of the selectable items describes a different filtering criterion and corresponds to a different range of values, and wherein the different ranges of values for the selectable items are based on the file objects present in a file object set that is being filtered for display of the file objects; receiving the user input from a user to at least one selected item of the selectable items to describe one or more filtering criteria for the display of the file objects in the file object set according to the user input and the at least one selected item; wherein the different ranges of values for the selectable items are based on actual ranges of an associated characteristic of the file objects of the file object set and on the distribution of the actual values of the associated characteristic in the file object set, wherein the different ranges are evenly divided between two extreme values that surround at least some of the actual values of the associated characteristic.

Another embodiment of the present invention provides a method for using filtering criteria in the display of file objects in a graphical user interface (GUI). The method comprises receiving a selection from a user of a characteristic of the file objects displayed in the GUI, displaying a menu of selectable filtering criteria for the selected characteristic, wherein the selectable filtering criterion includes a plurality of selectable items responsive to user input, wherein each of the selectable items describes a different filtering criterion and corresponds to a different range of values, and wherein the different ranges of values for the selectable items are based on the file objects that are being filtered for display; and filtering the display of the file objects according to the filtering criteria selected by the user as applied to the characteristic of the file objects; wherein the different ranges of values for the selectable items in the menu are based on actual ranges of the selected characteristic of the file objects being filtered and on the distribution of the actual values of the selected characteristic in the file objects being filtered, wherein the different ranges are evenly divided between two extreme values that surround at least some of the actual values of the selected characteristic.

A further embodiment of the present invention provides a non-transitory computer readable medium including program instructions to be implemented by a computer, the program instructions allowing filtering criteria to be applied in the display of file objects in a graphical user interface (GUI). The program instructions implementing the steps comprises: displaying aplurality of selectable items responsive to user input, wherein each of the selectable items describes a different filtering criterion and corresponds to a different range of values, and wherein the different ranges of values for the selectable items are based on the file objects present in a file object set that is being filtered for display of the file objects; receiving the user input from a user to at least one selected item of the selectable items to describe one or more filtering criteria for the display of the file objects; and filtering the display of the file objects in the file object set according to the user input and the at least one selected item; wherein the different ranges of values for the selectable items are based on actual ranges of an associated characteristic of the file objects of the file object set and on the distribution of the actual values of the associated characteristic in the file object set, wherein the different ranges are evenly divided between two extreme values that surround at least some of the actual values of the associated characteristic.

A still further embodiment of the present invention provides a system for providing filtering criteria in the display of file objects in a graphical user interface (GUI). The system comprises: a mechanism that displays a plurality of selectable items responsive to user input, wherein each of the selectable items describes a different filtering criterion and corresponds to a different range of values, and wherein the different ranges of values for the selectable items are based on the file objects present in a file object set that is being filtered for display of the file objects; a mechanism that receives the user input from a user to at least one selected item of the selectable items to describe one or more filtering criteria for the display of the file objects; and a mechanism that filters the display of the file objects in the file object set according to the user input and the at least one selected item; wherein the different ranges of values for the selectable items are based on actual ranges of a selected characteristic of the file objects of the file object set and on the distribution of the actual values of the selected characteristic in the file object set, wherein the different ranges are evenly divided between two extreme values that surround at least some of the actual values of the selected characteristic.

Yet another embodiment of the present invention provides a non-transitory computer readable medium including program instructions to be implemented by a computer, the program instructions allowing filtering criteria to be applied in the display of file objects in a graphical user interface (GUI). The program instructions implementing the steps comprise: receiving a selection from a user of a characteristic of the file objects displayed in the GUI; displaying a menu of selectable filtering criteria for the selected characteristic, wherein the selectable filtering criterion includes a plurality of selectable items responsive to user input, wherein each of the selectable items describes a different filtering criterion and corresponds to a different range of values, and wherein the different ranges of values for the selectable items are based on the file objects that are being filtered for display; and filtering the display of the file objects according to the filtering criteria selected by the user as applied to the characteristic of the file objects; wherein the different ranges of values for the selectable items in the menu are based on actual ranges of the selected characteristic of the file objects being filtered and on the distribution of the actual values of the selected characteristic in the file objects to be filtered, wherein the different ranges are evenly divided between two extreme values that surround at least some of the actual values of the selected characteristic.

BRIEF DESCRIPTION OF THE DRAWINGS

FIG. 2 is a diagrammatic illustration of a window in a graphical user interface including features for use with a second embodiment of the present invention;

DETAILED DESCRIPTION

The present invention relates to file display and navigation for computer systems, and more particularly to file display and navigation in a graphical user interface. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention will be described in terms of a particular graphical user interface. However, one of ordinary skill in the art will readily recognize that this method and system will operate effectively for other graphical user interfaces and similar interfaces. The present invention will also be described in the context of methods having particular steps. However, the method and system operate effectively for other methods having different and/or additional steps not inconsistent with the present invention.

Figure 1:
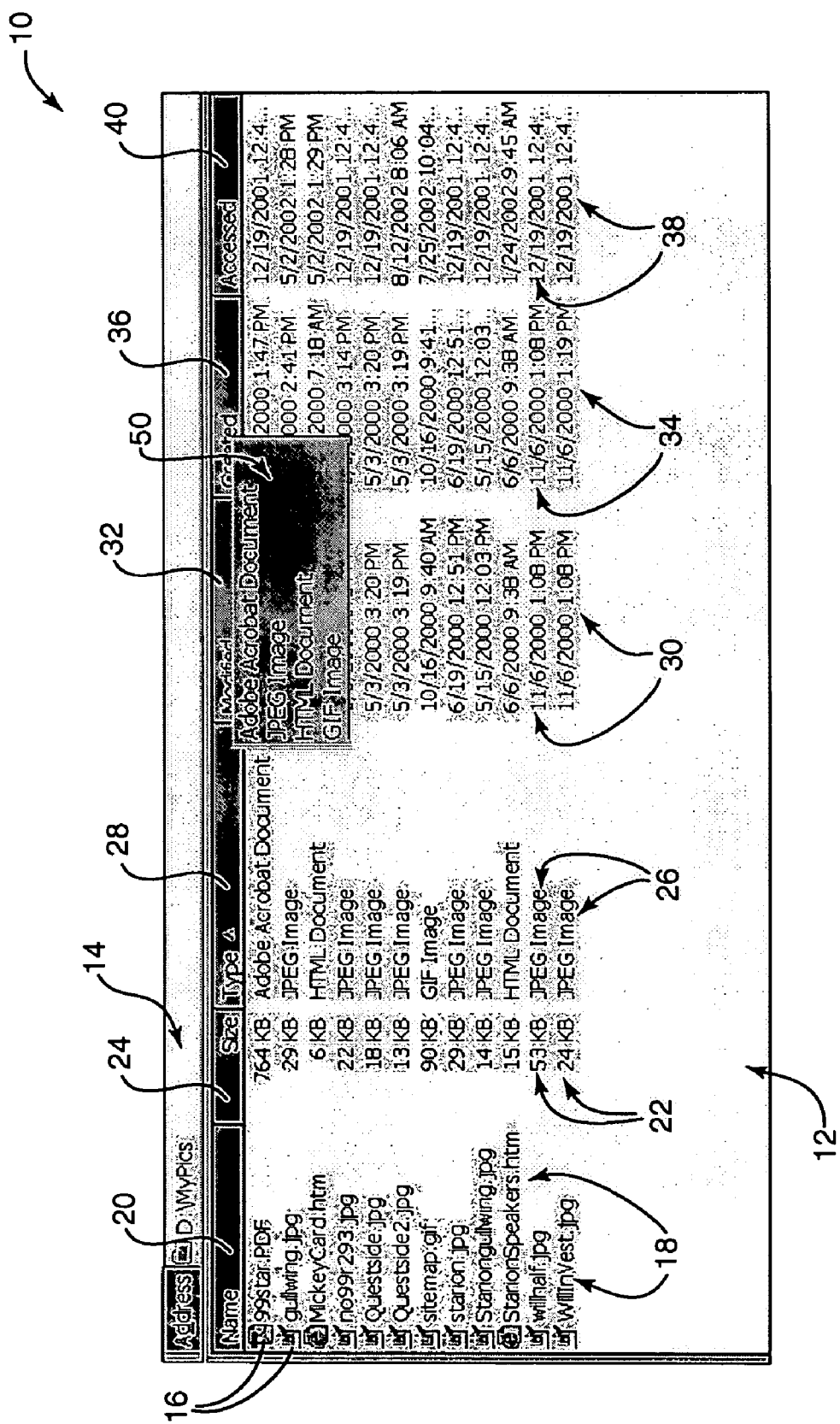
FIG. 1 is a diagrammatic illustration of a window in a graphical user interface including features for use with a first embodiment of the present invention.

FIG. 1 is a diagrammatic illustration of one example 10 of the present invention, in which a user can input filter criteria for file navigation in a GUI using a menu. Navigation window 12 is a feature of a GUI whose elements are displayed on a display device of a computer system. Any type of computer system can be used. For example, a PC, Apple Macintosh, other desktop computer, or a workstation can be used. Alternatively, the GUI can be provided on a portable computer or device, such as a laptop computer, personal digital assistant (PDA), cellular phone, pen computer, or similar device. The computer system preferably includes well-known components, e.g., one or more microprocessors, memory (random access memory (RAM) and/or read-only memory (ROM), volatile and/or non-volatile), other storage devices (hard drive, optical disc, etc.), and input/output (I/O) components, such as input interfaces (keyboard, mouse, trackball, stylus, touchscreen, voice recognition hardware/software, etc.) and output devices (display screen, sound output devices, printer, etc.). The display device of the computer system that displays the GUI can be a cathode ray tube (CRT) monitor, flat screen display, touchscreen, display goggles, projector, or other display device.

Navigation window 12 of the GUI displays the contents of a folder (directory), where the folder contents are stored on one or more hard drives, floppy drives, CD- or DVD-ROM, memory (RAM or ROM), or other storage device accessed by the computer system. The description of the drive and folder, "D:\MyPics," is shown in the Address text bar 14, indicating that window 12 shows the file object contents of the "MyPics" directory, which is located on a storage device labeled "D."

A number of "file objects," e.g., files and folders (directories), are displayed in the window 12. In FIG. 1, the window 12 displays characteristics of the file objects or information concerning the file objects in a number of vertical columns, each column labeled by a column heading (i.e., column heading object, since it selectable), which is sometimes more generically referred to herein as a "label object" since it labels the particular file object characteristic that the column is associated with. In many GUI implementations, a column heading can be selected by a user to organize the ordering of the display of the file objects according to the file characteristic associated with the selected column heading.

In the example of FIG. 1, several file object characteristics are displayed, each in a distinct column. File icons 16 representing the file objects, and the names 18 of the file objects, are displayed in the leftmost column, which is labeled with a Name column heading 20. The storage size 22 of each file object is displayed in the next column, which is labeled with the Size column heading 24. Each file size can be indicated in bytes, for example. The file type 26 of each file is displayed in the next column, which is labeled with the Type column heading 28. For example, file types such as "jpeg," "gif," or "bmp" can be used, which are different types of graphics image formats. Other file object types can include HTML (Hypertext Markup Language) for web-based documents, text, etc. Some file object types may be proprietary to a particular application program or format, such as Lotus Notes, Adobe Acrobat, Microsoft Word document, Microsoft Excel document. In some operating systems such as Windows, types of files can be indicated by an extension of three or more letters after a final period in the filename of the file object; for example, a ".exe" extension on a file indicates it is an executable type of file that can be selected by the user to cause the file to execute. Any these types can be indicated in column 28 if they apply to the displayed file objects.

The next column, labeled with the Modified column heading 32, displays the date and time 30 when each file object was last modified by a user. The format of displaying the date can be changed to a desired format, e.g., month first, day first etc. The date and time 34 of when each file was created is displayed in the next column, which is labeled with the Created column heading 36. The date and time 38 of when each file was last accessed by a user is displayed in the next column, which is labeled with the Accessed column heading 40.

In other embodiments or configurations, the columns can be in different positions relative to each other, or additional information and/or columns can be displayed as dictated by the user's preferences. No folders are shown in the example of FIG. 1; if folders are present in a directory or drive, a folder icon and folder name can be displayed in the Name column, similarly to files 18, as well as any other desired and applicable information in the other columns.

In FIG. 1, a user has selected a column heading 28, e.g., using a cursor and a left mouse button, a cursor and a right mouse button, a keyboard key, or other selection control. In response to the selection of the column heading, a filter menu 50 is displayed. The filter menu 50 displays file object characteristics, displayed as menu items, for the user to select to filter the display of files in window 12, where the available menu item selections are based on the particular column heading that was initially selected. Any menu items selected by the user will cause the display in window 12 to change so that file objects having the selected characteristics are filtered out, i.e., not displayed in the window. It should be noted that the file objects filtered out are not actually deleted from the window or directory; they are simply not displayed, to make navigation of the desired files easier for the user.

For example, when the Type column heading 28 is selected, as shown in FIG. 1, the filter menu 50 shows the types of all the file objects that are currently placed in the MyPics folder, as shown in window 12. These types include Adobe Acrobat document, JPEG image, HTML document, and GIF image. If the user selects one of the types in the menu, that type of file is immediately filtered out from the display of file objects in window 12 (or, alternatively, the window display is updated with the filter criteria after the menu 50 is removed from the screen). In a preferred embodiment, each item in the menu initially has a check mark or other visual indicator (not shown in FIG. 1) to show it is being displayed in window 12 and is not being filtered out. When the user selects an item, the check mark is removed and the file objects having the selected characteristic are hidden (removed from the listed files in window 12). If the user later selects an unchecked item, the check mark is again displayed, as are the file objects with that characteristic (and so on, as a toggle). The check marks (or other indicators) thus show the "displayed" or "hidden" status of file objects with the indicated characteristics.

In one embodiment, the menu 50 remains displayed after the user has selected an item; this allows the user to select additional items, if desired. The menu can be removed from the display when the user provides another command, such as a left click on a location away from the menu 50, or a right click anywhere, etc. In a different embodiment, once the user selects an item in menu 50, the menu is automatically removed from the display, and the user would have to click on the column heading again to display the menu again to select another menu item. An indicator, such as the small triangle shown next to the "Type" label of header 28 in FIG. 1, can be displayed to indicate which column is being filtered when the menu 50 is displayed. This indicator can also be displayed in some embodiments at all times to indicate that the column which it designates has been modified by filtering criteria.

It should be noted that folders can also be selected to be filtered out or displayed via menu 50, where the "Type" of every folder can be simply "folder" or similar designation.

For columns in window 12 that refer to a numeric value or other type of value, the menu 50 can display various ranges of values. For example, the Size column heading 24, when selected, can display a filter menu 50 that has as its items, "Less than 10 KB," "10-100 KB," "101-200 KB," "201-500 KB," "501-1000 KB," "1001-2000 KB," "2001-5000 KB," "5001 KB-10 GB," "Greater than 10 GB," and "All Sizes" (the initial setting before filtering criteria are selected). Other embodiments can provide any desired amount of ranges, and their values; and some embodiments can allow the user to determine the ranges in preference settings. Furthermore, in some embodiments, the selectable ranges in the filter menu 50 can be based on the actual ranges of the associated characteristic of all the file objects in the window 12. For example, if all the files in the folder MyPics have sizes ranging from 6 KB to 764 KB (as shown in FIG. 1), then the available ranges provided in menu 50 can be between these extreme values, broken down into suitable ranges based on the distribution of sizes in the MyPics folder. For example, since only one file, "99star.PDF," is over 90 KB in size, the last range in the menu 50 can be "Greater than 90 KB" and the remaining selectable ranges can be evenly divided between 6 KB and 90 KB. A similar range display and distribution can be provided for other columns associated with values; for example, when the Modified column heading 32 is selected, the available ranges of dates in the associated filter menu 50 can be based on the actual distribution of modified dates of the files in the MyPics folder. Different folders having file objects with different ranges of sizes, dates, etc. would provide different range selections in the menu 50.

The user can preferably enter filtering criteria for multiple columns (i.e., multiple file characteristics) so that the filter criteria are all collectively applied to the display of file objects, i.e. filtering using compound criteria. This can be accomplished, for example, by simply selecting one column heading and selecting the desired filtering criteria for that column, selecting a different column heading and selecting the filtering criteria for that column, and so on. The filtering criteria from different columns is then applied additively.

In a different embodiment, the filter menu 50 can function with the opposite effect as described above. For example, the selected items in the menu can cause all file objects that correspond to the selected items (which have a check mark) to be filtered out and hidden.

In the preferred embodiment, selected filtering criteria apply only to the displayed folder or hard drive, and navigating away from that folder will clear the filter so that the user will have to enter the criteria again if the folder is viewed again. In other embodiments, filter settings can remain stored with the folder and will always apply when viewing the folder until manually cleared (preferably with some sort of indication or reminder to the user that filtering criteria are being applied). In some embodiments, the filtering criteria of a folder can also be automatically applied to subdirectories within that folder. All these options can be provided as user preferences in the GUI, e.g. via menus.

FIG. 2 is a diagrammatic illustration of another embodiment 100 of the present invention, in which a user can input filter criteria for file navigation in a GUI using a text input field. As in the example of FIG. 1, a window 12 displays the contents of the folder (directory) MyPics, located on the hard drive of the computer system, and which holds the same file objects as in FIG. 1. The same column headings 20, 24, 28, 32, 36, and 40 as shown in FIG. 1 are displayed, with the appropriate information associated with the file objects in the columns under these headings.

In the embodiment 100, when the user selects a column heading, a filter display/input field 102 is displayed instead of (or in addition to, in some embodiments) the filter menu 50 of FIG. 1. The input field 102 can be displayed in place of the Address text bar 14 of FIG. 1, as shown in FIG. 2. In other embodiments, the input field can be displayed in other locations, e.g., below the address bar 14, in a separate toolbar or window, etc.

The filter input field 102 allows the user to enter, via a text string, filter criteria for the displayed file objects in window 12. Thus, as shown in FIG. 2, if the user has selected the Modified column header 32, a Modified filter input field 102 will be displayed, indicated by the "Modified" label 104. This input field is associated with the window 12; a different window of the GUI would preferably have its own input field. The user then inputs the text filter criteria; in this example, the text is ">'06/01/2000'", indicating that the user wishes to have displayed only the file objects having a modified date later than Jun. 1, 2000. If the user wanted a range between two dates, then the two dates, separated by a dash character or the word "to", can be entered. Variations of the syntax for entering filtering criteria can be used in different embodiments. In other embodiments (or according to user preferences), the entered date range can cause the file objects in that range to be hidden rather than displayed. As in FIG. 2, an indicator such as the small triangle shown next to the "Modified" label can indicate that this column currently has an input text field displayed, and/or can indicate that this column has had filtering criteria applied.

Similarly, for other columns, textual filtering criteria can be entered in an associated input field similar to field 102. For example, in a "Type" input field associated with the Type column heading 28, the user can enter "GIF," "JPG," "PDF," or other types of files which to filter by. In a filter input field associated with the Size column heading 24, text describing a size range, such as "10 KB-20 KB", can be input.

In a preferred embodiment, filtering criteria for multiple columns of a window can be entered in a single filter input field 102. Thus, the user can enter a date range, followed by a size range and a type, and all criteria will be used in the filtering. Any desirable syntax can be implemented to separate filter criteria. For example, well-known Boolean search operators can be used (AND, OR, etc.), and/or commands in a known syntax, such as Structured Query Language (SQL) used in databases such as DB2. In other embodiments, each column can have its own, dedicated input field, where multiple fields can be displayed simultaneously if filtering criteria are specified in multiple columns.

Some embodiments can display a filter input field such as field 102 in addition to the menu 50 of FIG. 1 when a user selects a column heading. When the user selects filtering items from the menu 50, the results would then be displayed in the text input field 102 as if the user had manually typed them in. Thus, if the user selected filtering items from different columns using menus 50, the combined, total filtering criteria could be viewed in field 102, with the filtering criteria separated by appropriate syntax. In such a case of displaying filter criteria associated multiple columns, the label 104 of the field 102 can be a less specific, overall label, such as "Filter."

It should be noted that the menu method of filter criteria selection of FIG. 1 can be used for some columns, while the text input field of FIG. 2 can be used for other columns within a single window 12. For example, the menu 50 of FIG. 1 might be easier and more appropriate for selecting Type filer criteria, while the text input field 102 may be more efficient for entering ranges of values, as used for size, date of creation, or other criteria. The user can optionally be allowed to select which type of input method he or she prefers to use for each column.

Figure 3:
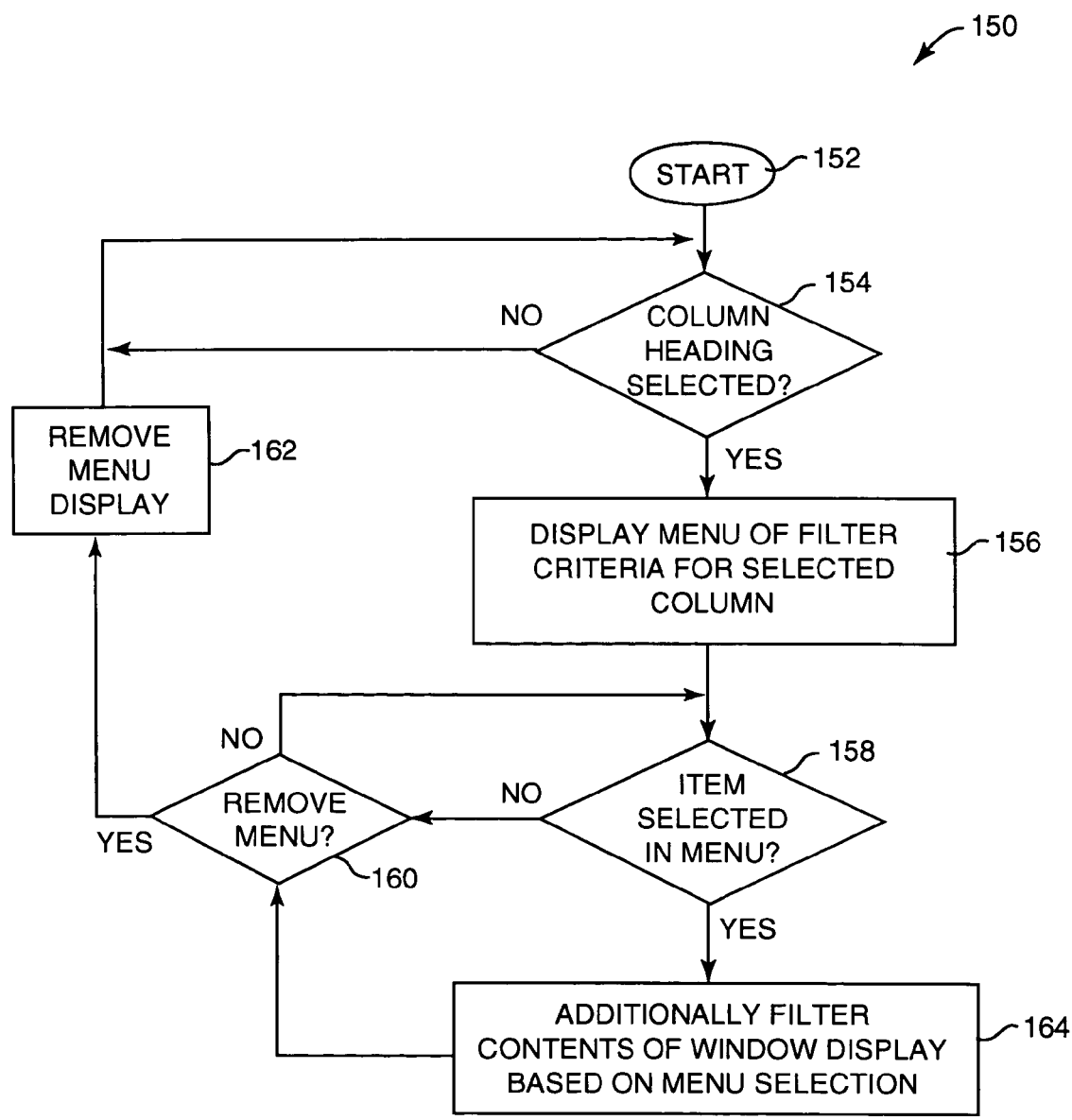
FIG. 3 is a flow diagram illustrating a method of the present invention for use with the embodiment of FIG. 1.

FIG. 3 is a flow diagram illustrating a first method 150 in accordance with the present invention for assisting in the navigation of files within a GUI on a computer system, in which a filter menu is displayed as in FIG. 1. This method, and other methods described herein, are typically implemented using program instructions stored on a computer readable medium, such as memory, hard drive, optical disk (CD-ROM, DVD-ROM, etc.), magnetic disk, etc. The steps of these methods can be implemented in hardware (logic gates, etc.), software, or a combination thereof.

The method begins at 152, and in a step 154, the method checks whether a column heading of the particular folder window is selected, such as one of the column headings 20, 24, 28, 32, 36, and 40 of window 12 in FIG. 1. This selection can be by mouse left-click or right-click, keyboard key, or other input pointing device and/or cursor. In next step 156, a filter menu is displayed which shows menu items corresponding to filter criteria for the selected column, an example of which is shown as menu 50 in FIG. 1 for the column under the Type column heading 28. The filter menu can be displayed near the column heading, a different area in the folder window, or in a separate window or area outside the folder's window.

In step 158, the process checks whether a selection is made in the displayed menu of step 156. For example, the user can simply left-click on an item in the menu. If no selection is made, then the process checks in step 160 whether to remove the menu from the screen. This can occur, for example, if the user clicks in the GUI outside the menu, right-clicks, selects an exit option, or performs other standard input commands, as is well known in GUIs. If the menu is to be removed, then in step 162 it is removed from the screen, and the process returns to normal processing and checking as to whether a column heading is selected in step 154. If the menu is not to be removed in step 160, then the process returns to step 158 to check for a selection in the menu.

If a selection of a menu item is made by the user in step 158, then the process continues to step 164, in which the contents of the folder display are additionally filtered based on the user's selection. Thus, the files and folders displayed in the folder window are filtered based on the item just selected by the user, in addition to being filtered by any filter criteria previously entered by the user (or set as a default). The filtered results are displayed in the display window, e.g. window 12 of FIG. 1. In some embodiments, a text input field or text display is updated and also displayed to show a syntax version of the filter criteria, as described in greater detail with respect to FIG. 2. Once the displayed folder/drive contents have been filtered, the process continues to step 160 to check if the menu should be removed. In one embodiment, the menu is only removed when all the desired menu items have been selected and the user provides an appropriate command to remove the menu, such as selecting another area of the GUI, providing a right button click on a mouse, etc. If the menu is to be removed, after removing the menu in step 162, the process returns to step 154 to check for the selection of a column heading. If the menu is not to be removed, the process continues to step 158 to check for another menu selection.

Figure 4:
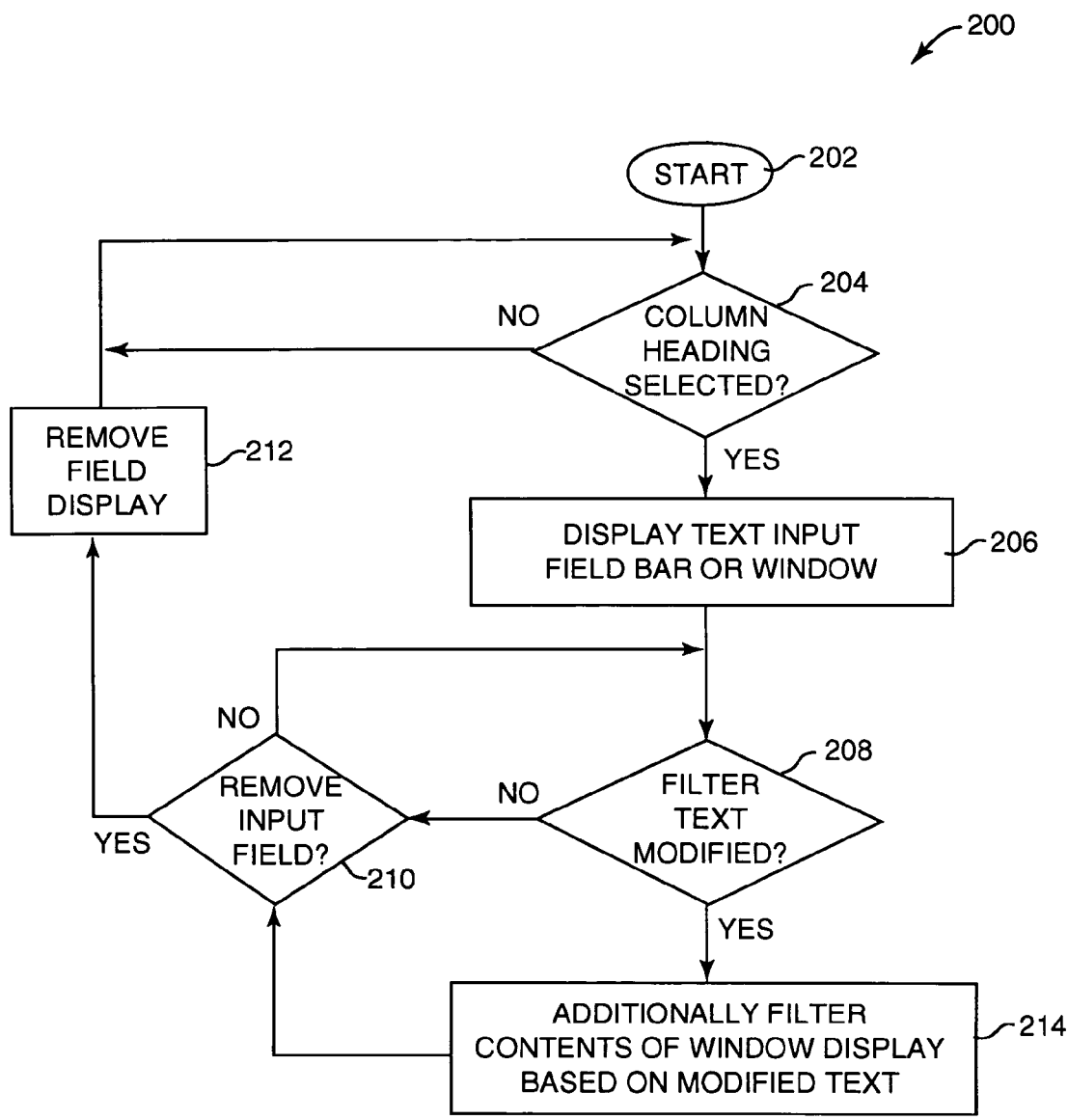
FIG. 4 is a flow diagram illustrating a method of the present invention for use with the embodiment of FIG. 2.

FIG. 4 is a flow diagram illustrating another method 200 in accordance with the present invention for assisting in the navigation of files within a GUI on a computer system, in which filter criteria is entered via a text input field as in FIG. 2. The method begins at 202, and in a step 204, the method checks whether a column heading of the particular folder window is selected, such as one of the column headings 20, 24, 28, 32, 36, and 40 of window 12 in FIG. 2. In next step 206, a text bar or window is displayed, which shows the current display filter criteria (if any) for the selected column of window 12, and allows a user to modify the filter criteria by typing in text characters, deleting characters, etc. An example of a text display/input field is shown as field 102 in FIG. 2 for the column under the Modified column heading 32. The input field can be displayed in place of an Address bar as shown in FIG. 2, or in some other location within or external to window 12.

In step 208, the process checks whether filter text is modified in the displayed field of step 206. This modification can be adding new filter criteria, and/or deleting old criteria, and/or modifying existing criteria. In the described embodiment, the text is modified by having the user select the field with a cursor, and enter the text modifications, e.g., via a keyboard, pen, or other input device. Preferably, the filter criteria is provided in a particular syntax, such as Boolean operators, keywords, etc. In other embodiments, the modifications can be entered in other ways. In some embodiments that allow menu selection for inputting filter criteria, the text input field can be modified by the user selecting menu items, where the textual equivalent of the selected items appears in the input field after selection.

If the filter text is not modified, the process checks in step 210 whether to remove the input field from the screen. This can occur, for example, if the user clicks in the GUI outside the input field, right-clicks, selects an exit option, or performs other standard input commands, as is well known in GUIs. If the input field is to be removed, then in step 212 it is removed from the screen, and the process returns to normal processing and checking as to whether a column heading is selected in step 204. In some embodiments, the filter input field can revert to a more general designation, such as "Filter" or "Address"; or the input field can be completely removed from the screen. If the menu is not to be removed in step 210, then the process returns to step 208 to check for text modification in the input field.

If the filter text is modified by the user in step 208, then the process continues to step 214, in which the contents of the folder display are additionally filtered based on the user's modifications. Thus, the files and folders displayed in the folder window are filtered based on the text in the input field. The filtered results are displayed in the display window, e.g. window 12 of FIG. 2. Once the displayed folder contents have been filtered, the process continues to step 210 to check if the input field should be removed. If the menu is to be removed, after step 212 removes the input field, the process returns to step 204 to check for the selection of a column heading. If the menu is not removed, the process continues to step 208 to check for filter text modification.

The embodiments described above refer to "columns" and column headings for selecting attributes of files, which is appropriate for GUIs which display files in that manner, as shown in FIGS. 1 and 2. In other GUI embodiments, however, file characteristics and attributes may be displayed in other ways or configurations. The present invention is application to such other embodiments, e.g. a user can select the characteristic heading or icon to cause a selection menu and/or input field to be displayed that allows the input of filtering criteria.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for using filtering criteria in the display of file objects in a graphical user interface (GUI), the method comprising: displaying a plurality of selectable items responsive to user input, wherein each of the selectable items describes a different filtering criterion and corresponds to a different range of values, and wherein the different ranges of values for the selectable items are based on the file objects present in a file object set that is being filtered for display of the file objects; receiving the user input from a user to at least one selected item of the selectable items to describe one or more filtering criteria for the display of the file objects; and filtering the display of the file objects in the file object set according to the user input and the at least one selected item; wherein the different ranges of values for the selectable items are based on actual ranges of an associated characteristic of the file objects of the file object set and on the distribution of the actual values of the associated characteristic in the file object set, wherein the different ranges are evenly divided between two extreme values that surround at least some of the actual values of the associated characteristic.

2. A method for using filtering criteria in the display of file objects in a graphical user interface (GUI), the method comprising: receiving a selection from a user of a characteristic of the file objects displayed in the GUI; displaying a menu of selectable filtering criteria for the selected characteristic, wherein the selectable filtering criteria includes a plurality of selectable items responsive to user input, wherein each of the selectable items describes a different filtering criterion and corresponds to a different range of values, and wherein the different ranges of values for the selectable items are based on the file objects that are being filtered for display; and filtering the display of the file objects according to the filtering criteria selected by the user as applied to the characteristic of the file objects; wherein the different ranges of values for the selectable items in the menu are based on actual ranges of the selected characteristic of the file objects being filtered and on the distribution of the actual values of the selected characteristic in the file objects being filtered, wherein the different ranges are evenly divided between two extreme values that surround at least some of the actual values of the selected characteristic.

3. A non-transitory computer readable medium including program instructions to be implemented by a computer, the program instructions allowing filtering criteria to be applied in the display of file objects in a graphical user interface (GUI), the program instructions implementing steps comprising: displaying a plurality of selectable items responsive to user input, wherein each of the selectable items describes a different filtering criterion and corresponds to a different range of values, and wherein the different ranges of values for the selectable items are based on the file objects present in a file object set that is being filtered for display of the file objects; receiving the user input from a user to at least one selected item of the selectable items to describe one or more filtering criteria for the display of the file objects; and filtering the display of the file objects in the file object set according to the user input and the at least one selected item; wherein the different ranges of values for the selectable items are based on actual ranges of an associated characteristic of the file objects of the file object set and on the distribution of the actual values of the associated characteristic in the file object set, wherein the different ranges are evenly divided between two extreme values that surround at least some of the actual values of the associated characteristic.

4. A system for providing filtering criteria in the display of file objects in a graphical user interface (GUI), the system comprising: a mechanism that displays a plurality of selectable items responsive to user input, wherein each of the selectable items describes a different filtering criterion and corresponds to a different range of values, and wherein the different ranges of values for the selectable items are based on the file objects present in a file object set that is being filtered for display of the file objects; a mechanism that receives the user input from a user to at least one selected item of the selectable items to describe one or more filtering criteria for the display of the file objects; and a mechanism that filters the display of the file objects in the file object set according to the user input and the at least one selected item; wherein the different ranges of values for the selectable items are based on actual ranges of an associated characteristic of the file objects of the file object set and on the distribution of the actual values of the selected characteristic in the file object set, wherein the different ranges are evenly divided between two extreme values that surround at least some of the actual values of the selected characteristic.

5. A non-transitory computer readable medium including program instructions to be implemented by a computer, the program instructions allowing filtering criteria to be applied in the display of file objects in a graphical user interface (GUI), the program instructions implementing steps comprising: receiving a selection from a user of a characteristic of the file objects displayed in the GUI; displaying a menu of selectable filtering criteria for the selected characteristic, wherein the selectable filtering criteria includes a plurality of selectable items responsive to user input, wherein each of the selectable items describes a different filtering criterion and corresponds to a different range of values, and wherein the different ranges of values for the selectable items are based on the file objects that are being filtered for display; and filtering the display of the file objects according to the filtering criteria selected by the user as applied to the characteristic of the file objects; wherein the different ranges of values for the selectable items in the menu are based on actual ranges of the selected characteristic of the file objects being filtered and on the distribution of the actual values of the selected characteristic in the file objects to be filtered, wherein the different ranges are evenly divided between two extreme values that surround at least some of the actual values of the selected characteristic.

* * * * *